(12) United States Patent
Kitchin et al.

(10) Patent No.: US 7,719,925 B2
(45) Date of Patent: May 18, 2010

(54) VERTICAL LINE HYDROPHONE ARRAY

(75) Inventors: David A. Kitchin, Laurel, MD (US);
Charles W. Kerechanin, II, Burtonsville, MD (US); Charles B. Cooperman, Highland, MD (US); Juan I. Arvelo, Jr., Dayton, MD (US); Ronald W. Mitnick, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 878 days.

(21) Appl. No.: 11/548,006

(22) Filed: Oct. 10, 2006

(65) Prior Publication Data

US 2009/0207698 A1    Aug. 20, 2009

Related U.S. Application Data

(60) Provisional application No. 60/726,774, filed on Oct. 14, 2005.

(51) Int. Cl.
*G01V 1/20*    (2006.01)
(52) U.S. Cl. ..................... 367/154; 367/153; 367/173
(58) Field of Classification Search ................. 367/153, 367/154, 173
See application file for complete search history.

(56) References Cited

U.S. PATENT DOCUMENTS

| | | | | |
|---|---|---|---|---|
| 3,409,869 | A | * | 11/1968 | McCool et al. ............. 367/153 |
| 3,585,578 | A | * | 6/1971 | Fischer, Jr. .................... 367/88 |
| 3,889,230 | A | | 6/1975 | Knott et al. |
| 3,990,123 | A | | 11/1976 | Stachiw et al. |
| 4,371,957 | A | | 2/1983 | Sandoz et al. |
| 4,786,837 | A | * | 11/1988 | Kalnin et al. ................ 310/364 |
| 4,995,013 | A | * | 2/1991 | Dumaine et al. ............ 367/153 |
| 5,027,333 | A | | 6/1991 | Halling |
| 5,117,396 | A | | 5/1992 | Castile et al. |
| 5,257,243 | A | | 10/1993 | DeChico et al. |
| 5,367,500 | A | * | 11/1994 | Ng .............................. 367/157 |
| 5,469,407 | A | | 11/1995 | Saunders |
| 6,050,361 | A | * | 4/2000 | Ruffa et al. .................. 181/110 |
| 6,088,296 | A | | 7/2000 | Seaman et al. |
| 6,657,365 | B1 | | 12/2003 | Ambs |
| 6,671,230 | B1 | | 12/2003 | Benjamin |
| 6,801,475 | B2 | | 10/2004 | Anderson et al. |

OTHER PUBLICATIONS

U.S. Appl. No. 11/539,948, Kitchin et al.
P. Ferat et al., "Mid to High-Frequency Ambient Noise Anistrophy and Notch-Filling Mechanisms," New York, 2004.
D. Abraham et al., "Beamforming with Dominant Mode Rejection," Naval Underwater Systems Center, 1990 IEEE.
H. Cox et al., "Robust Adaptive Beamforming" IEEE Transactions on Acoustics, Speech and Signal Processing, vol. ASSP-35, No. 10, Oct. 1987.
F.T. Geyling, "Suspended Rigid Underwater Arrays," J. Hydronautics, vol. 3, No. 2, Apr. 1969.

* cited by examiner

*Primary Examiner*—Ian J Lobo
(74) *Attorney, Agent, or Firm*—Albert J. Fasulo, II

(57) ABSTRACT

A hydrophone assembly includes at least four hydrophone units for converting an acoustic signal to an electrical signal, the hydrophone units being in a parallel, cylindrically symmetric spaced spatial relationship with each other, and at least one spacer element to maintain the hydrophone units fixed in the spatial relationship to each other, wherein the hydrophone units and spacer element are embedded in an encapsulant to form an elongated, flexible body.

14 Claims, 4 Drawing Sheets

_US 7,719,925 B2_

VERTICAL LINE HYDROPHONE ARRAY

CROSS-REFERENCE TO RELATED APPLICATIONS

This application claims priority to prior filed, co-pending U.S. Provisional Application Ser. No. 60/726,774 filed Oct. 14, 2005, the entirety of which is incorporated herein by reference.

STATEMENT OF GOVERNMENTAL INTEREST

This invention is made with Government support under NAVSEA Contract No. N00024-03-D-6606, awarded by the U.S. Navy. The Government has certain rights in the invention.

BACKGROUND OF THE INVENTION

1. Field of the Invention

The present invention relates to a hydrophone assembly and a system and method for deploying the assembly, particularly in hydrophone arrays for underwater acoustic sensing of subsurface marine vehicles.

2. Description of the Related Art

Hydrophone arrays are used militarily to detect the presence of submarines and to provide information about their movements. Because modern submarines have the ability with cruise missiles to attack surface ships at great distances, the protection of surface shipping requires the ability to detect and track submerged submarines over vast areas of ocean. Hydrophone arrays have typically been used for this purpose.

Hydrophones are acoustic transducers that operate by detecting acoustic signals and converting them to electrical impulses that can then be transmitted by radio waves to a distant receiver. Typically, an array of hydrophones is loaded into a sonobuoy, which can then be dropped by airplane into the ocean. The array is then deployed while a float containing a transmitter remains at the surface of the water.

It is desirable to detect not only the presence and magnitude of acoustic signals, but also the direction of the signals. Various directional acoustic sensors are known. Such vector acoustic sensors often employ an accelerometer, which can add to the cost of such equipment. What is needed is a simple and less costly acoustic sensing system, which can also provide directional information about the received acoustic signals.

SUMMARY OF THE INVENTION

A hydrophone assembly is provided herein, the hydrophone assembly comprising at least four hydrophone units for converting an acoustic signal to an electrical signal, the hydrophone units being parallel, in a cylindrically symmetric spatial relationship with each other, and at least one spacer or semi-rigid exoskeleton element to maintain the hydrophone units fixed in the spatial relationship to each other, wherein said hydrophone units and spacer element are embedded to form an elongated, flexible body.

Also provided herein is a system for deploying the hydrophone assembly.

The invention herein advantageously provides a means for deploying a directional hydrophone assembly with less chance of twisting the hydrophone wires. The assembly is collapsible into a size A or smaller sonobuoy.

BRIEF DESCRIPTION OF THE DRAWINGS

Various embodiments are described below with reference to the drawings wherein.

DETAILED DESCRIPTION

Figure 1:
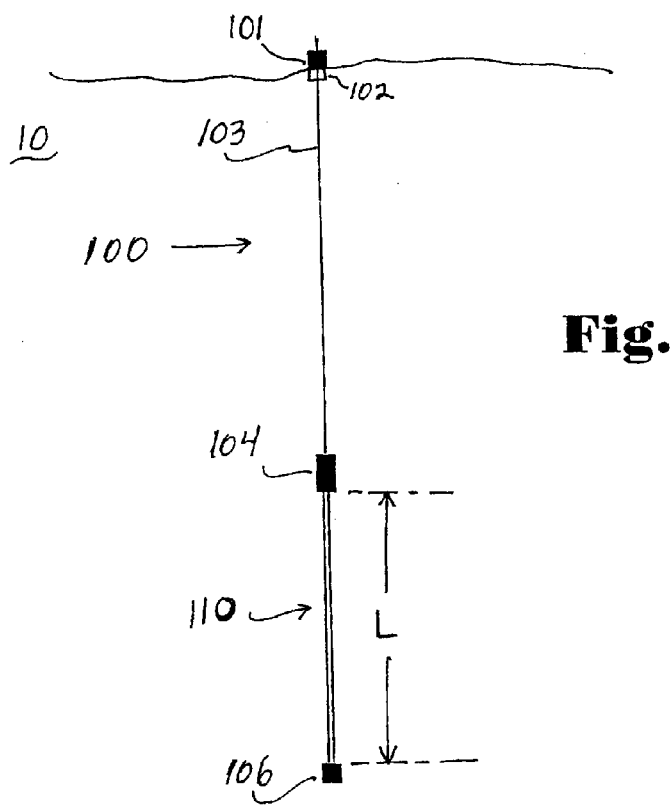
FIG. 1 illustrates the hydrophone deployment system as deployed in a body of water.
Figure 2:
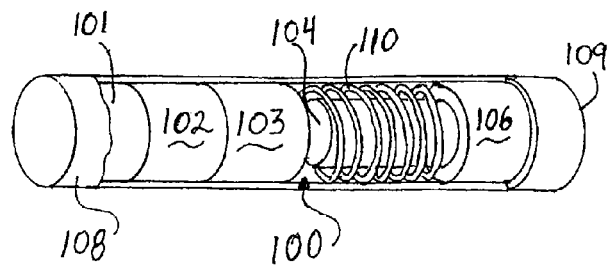
FIG. 2 illustrates the hydrophone deployment system of the invention loaded in a sonobuoy.

Referring now to FIGS. 1 and 2, the system 100 is shown deployed in a body of water 10 in FIG. 1 and packaged in a sonobuoy cannister 108 in FIG. 2. Deployment from the cannister 108 can be accomplished by, for example, dropping system 100 into the water 10 by airplane, surface vessel, or any other suitable means. Jettison of the contents of the system 100 from the sonobuoy cannister 108 can be accomplished by various means such as the impact of the sonobuoy into the water. Alternatively, a battery 102 (e.g., seawater activated battery) can power the ejection of the contents by, for example, firing a squib. Also, back plate 109 can be jettisoned (by water impact, firing a squib, etc.) to allow the hydrophone assembly 110 to descend to the proper depth. Float 101 remains at the surface of the body of water and preferably includes a transmitter with an antenna and the appropriate battery-powered electronics package 102 for converting the electrical signals from the hydrophones into radio waves for wireless transmission to a remote receiver. Tether 103 of compliant material includes a conductive wire for transmitting electrical signals from preamp electronics package 104 to the float 101. Typically, the tether 103 includes up to 250 feet of 1/16th inch diameter cable. Preamp electronics package 104 is discussed more fully below with reference to FIG. 5. Weight 106 serves to facilitate deployment of the hydrophone system 100 from the sonobuoy 108 and maintain the hydrophone assembly 110 in a vertical orientation once deployed. Hydrophone assembly 110 can be coiled around the preamp electronics package 104 when contained within the sonobuoy to make optimal use of the storage space available in the cannister 108. The sonobuoy cannister 108 can be size A or smaller.

The system 100 can be "active" or "passive." Active sonobuoy systems emit acoustic signals into the water and listen for the return echo. Passive systems merely listen for sounds made by underwater craft, e.g., power plant, propellers, door closings or other mechanically generated or human generated noise.

Figure 3:
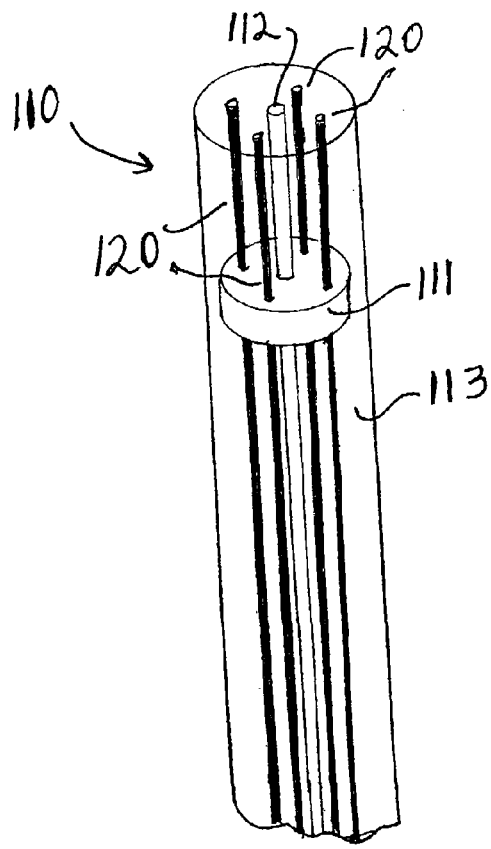
FIG. 3 illustrates the hydrophone assembly.
Figure 3A:
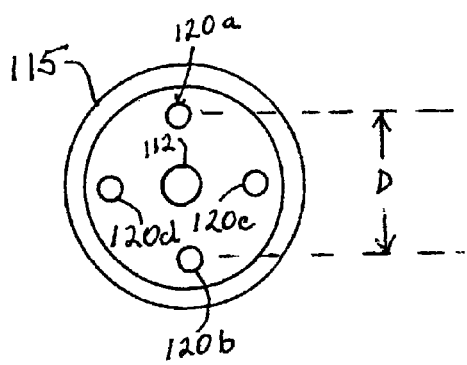
FIG. 3a is a plan view illustrating the arrangement of the hydrophone units in the assembly.

Referring additionally now to FIGS. 3 and 3a, the hydrophone assembly 110 includes at least four, and optionally five or more, hydrophone units 120 in a parallel array, optionally a non-metallic central wire 112 extending axially through the hydrophone assembly for structural support, and one or more spacer elements 111 through which the hydrophone units 120 and preferably non-metallic central wire 112 are disposed. In the embodiment in FIG. 3, spacer element 111 maintains the hydrophone units 120 and central wire 112 in a fixed, parallel, cylindrically symmetric spatial relationship. The central wire 112, hydrophone units 120 and spacer element 111 are preferably embedded in a pliable encapsulant 113, which helps secure the hydrophone array against undesirable helical twisting of the hydrophone assembly 110 and torsional misalignment of the hydrophones 120. Such misalignment causes errors in the directional information perceived and reported by the hydrophone assembly, hence the advantage of the encapsulant 113, spacer element 111 and optional structural wire 112 as means to prevent such twisting of the hydrophone assembly 110. Other means to accomplish this same end include fastening the hydrophones at regular intervals to an encompassing hose wall 115 (FIG. 3a), typically fiber reinforced, as an exoskeleton to ensure a preferred shape when not acted upon by external forces.

The encapsulant 113, when used, is preferably a polymeric potting/gelling agent which, when set, has a density-sound speed product similar to that of seawater so as to reduce the chance of modifying the acoustic signal passing through the assembly. The assembly is adapted to be potted as a unit with the hydrophone units 120 held under tension during the potting process until the potting agent is cured to a solid state from the liquid state. Suitable potting agents for use in the present invention include polyurethane "rho c" encapsulants available commercially from BF Goodrich Co.

The hydrophone assembly 110 is preferably continuous (i.e., unsegmented) along its entire length.

The optimal dimensions of the hydrophone array depend upon the target frequency of the acoustic signals, expected tilt of the array due to relative current between the surface float and the hydrophone array, operating depth, and the vertical acoustic beamwidth desired. A preferred length for the hydrophone units 120, depending on the design frequency and environmental conditions, is from about 128 to about 188, where 8 is the wavelength of the target acoustic signal. This length provides a balance between vertical beamwidth (given expected array tilt) and end-fire notch depth (to suppress any target frequency band noise originating from the surface float given the operating depth). For example, referring to FIG. 1, L is the length of the hydrophone wires and in a preferred embodiment is 168.

The diametrical spacing D shown in FIG. 3a between hydrophone units 120a and 120b in the array can preferably range from about 8/4 to about 8/20, more preferably about 8/10. D is also the spacing between hydrophones 120c and 120d. The optimal spacing is determined to optimize signal strengths without the need for a pre-whitening filter. By way of example, for a design frequency of 10 kHz, L is preferably about 95 inches and D is preferably about 0.984 inches. For a design frequency of 15 kHz, L is preferably about 63 inches, and D is preferably about 0.656 inches. The dimensions given above are for illustrative purposes, and values outside of the range given above can be used when appropriate, for example when optimizing the design to cover a range of frequencies.

Various types of acoustic transducers can be used as hydrophones to detect acoustic waves transmitted through the water. For example, the acoustic transducer can comprise a cylindrical tube formed at least in part of a piezo material. Piezo materials can be piezoelectric, which generate an electrical pulse or current upon receiving a mechanical impulse, or piezoresistive, which change resistance upon receiving a mechanical impulse. Piezoelectric material can comprise an active polarized ceramic material, such as barium titanate or lead zirconate titanate (PZT). The piezoelectric material can, in another embodiment, be a flexible piezoelectric polymeric material, such as polyvinylidene difluoride (PVDF), or a piezo-rubber composite material. Piezoresistive materials include, for example, conductive elastomeric polymeric foams or rubbers that become more conductive when compressed.

Figure 4:
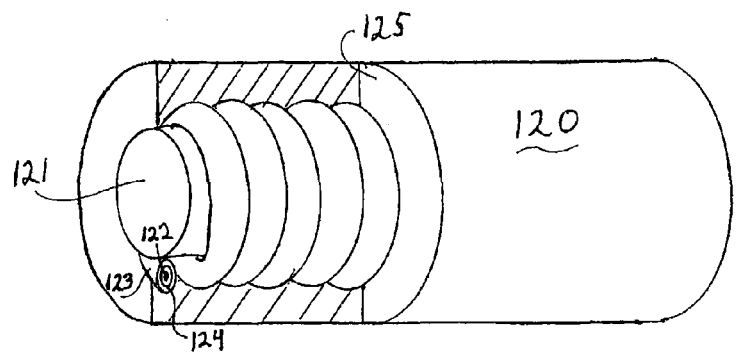
FIG. 4 is a perspective sectional view of an individual hydrophone unit.

For purposes of the present invention the hydrophone needs to be sufficiently flexible to be folded into a sonobuoy canister. Typically, hydrophones include a central or core conductor, an outer conductor, and a layer of piezo electric material disposed between, and in contact with, the core conductor and outer conductor in a coaxial configuration. When subjected to mechanical force the piezo material, such as polyvinylidene difluoride (PVDF) generates an electrical current, which is carried by the conductors. However, in a new, preferred embodiment, hydrophone 120 includes a "piano" wire type construction as shown in FIG. 4. In particular, a central wire 121 fabricated from a resilient metallic or non-metallic material, preferably spring steel, provides a resilient core which gives the hydrophone a shape memory and a biasing force such that when the hydrophone 120 is released from the canister 108 into the seawater it automatically returns to a straight configuration. A conductive wire coil 122 of smaller diameter wire than the central spring steel wire 121, is first coated with a layer 124 of piezo electric material (e.g., PVDF) and then, in one embodiment of the invention, is coated with a conductive layer 123 of copper, aluminum, silver, gold or the like. Preferably, conductive layer 123 is applied (e.g., by spraying, dipping, painting, etc.) as a silver ink. The conductive wire coil 122 is then tightly wound around the central wire 121. The conductive wire coil 122 is preferably fabricated from copper, aluminum, silver, gold, or alloys thereof, or of any other highly conductive ductile and flexible material. In an especially preferred embodiment, the wire coil 122 comprises a copper wire. In this embodiment the conductive wire coil 122 acts as an inner conductor and the conductive coating 123 acts as an outer conductor, both being in contact with the piezo electric material layer 124. Optionally, the conductive layer 123 can be applied after the piezo electric material-coated conductive wire 122 is coiled around the resilient central wire 121, preferably under pressure. In yet another embodiment the conductive layer (e.g., silver ink) is applied both before and after the piezo electric material-coated conductive wire 122 is coiled around the resilient central wire 121. Preferably, hydrophone 120 can include an outer jacket 125 of polyurethane or other waterproof, electrically insulative flexible material to prevent electrical signals from the hydrophone from being dissipated in the seawater. The copper coil 122 provides significantly greater flexibility than a comparably sized hydrophone using a coaxial configuration with a solid copper core. The hydrophone wire 120 typically has a diameter ranging from about ⅛ to about ⅒ inches.

Figure 5:
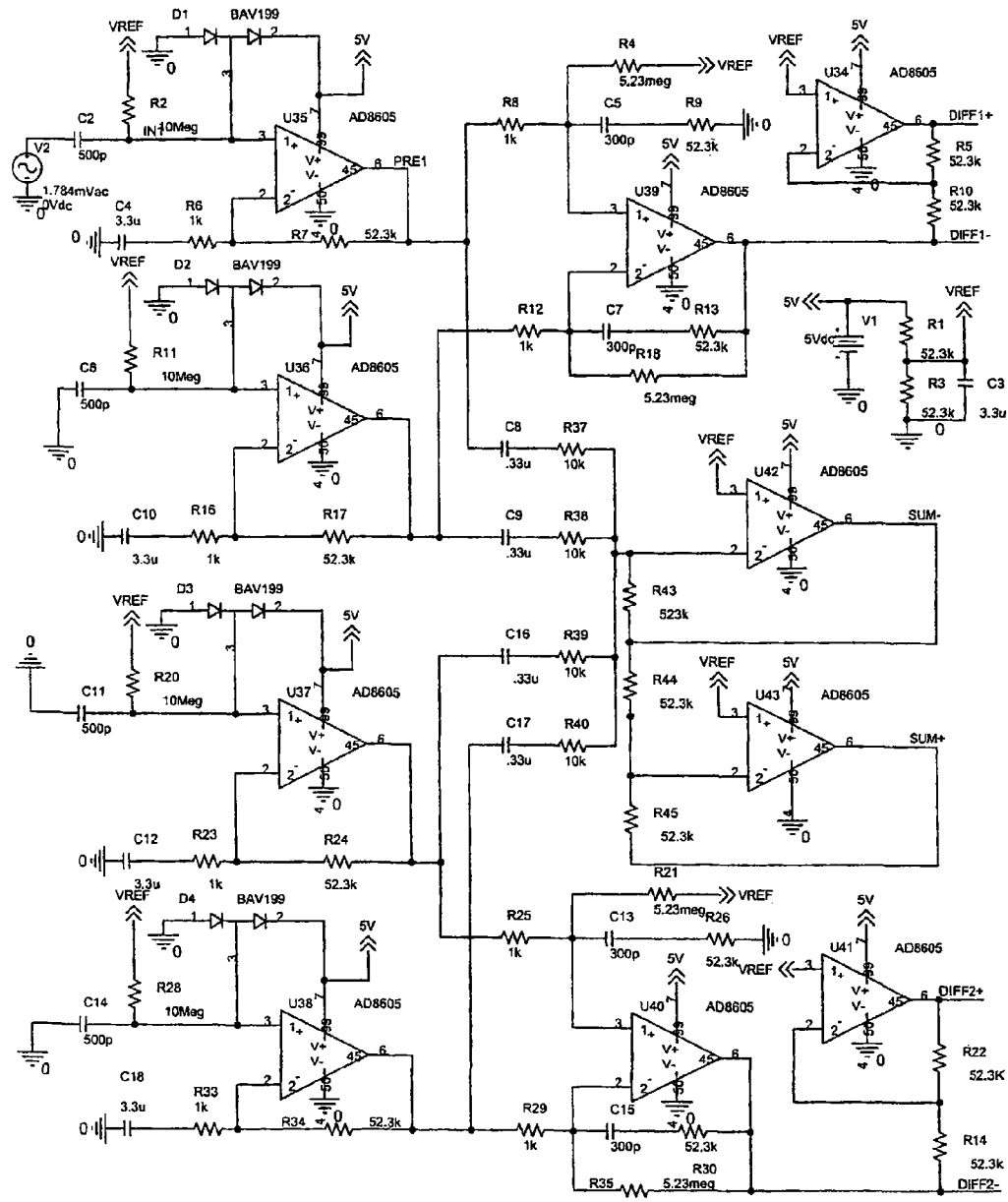
FIG. 5 is a circuit diagram of a sum and difference amplifier for use in conjunction with the hydrophone assembly according to the present invention.

FIG. 5 is a schematic diagram of a sum and difference amplifier used in conjunction with the hydrophone assembly according to the present invention. Each hydrophone unit 120 is electrically connected to an electronics package 104 which amplifies the electronic signal from the hydrophones and also calculates differences and sums of the electrical signals, applies a 1/f function, where f is the frequency, to provide more amplification of lower frequency signals than higher frequency signals as part of a weighting function.

Referring to FIGS. 3a and 5, each hydrophone 120a, 120b, 120c and 120d is connected to the amplifier and represented in FIG. 5 by the 500 pf capacitors C2, C6, C11 and C14, respectively. The capacitors shown in FIG. 5 are capacitive representations of the hydrophones. For example, the 500 pf capacitors C2, C6, C11 and C14 represent a hydrophone having a length of 48. When the piezoelectric material of the hydrophone elements 120a-120d is excited by a incident wave in the water, the amplifier of FIG. 5 receives a signal from each of the hydrophone elements 120a-120d. FIG. 5 shows this signal as V2 attached to hydrophone C2, and in operation, an incident wave produces a signal on each hydrophone. The amplifier then produces three differential signals, DIFF1, DIFF2 and SUM, from the signals received from the hydrophone elements. DIFF1 is a differential signal based on the difference between signals received from opposing hydrophones 120a and 120b. DIFF2 is a differential signal based on the difference between signals received from opposing hydrophones 120c and 120d. SUM is a differential signal based on the summation of signals received from hydrophones 120a-120d. These sum and difference signals are analogous to standard directional frequency and ranging (DIFAR) sonobuoy signals that when digitized and applied to the DIFAR processor's trigonometric equations, the direction a sound came from can be determined.

Figure 6:
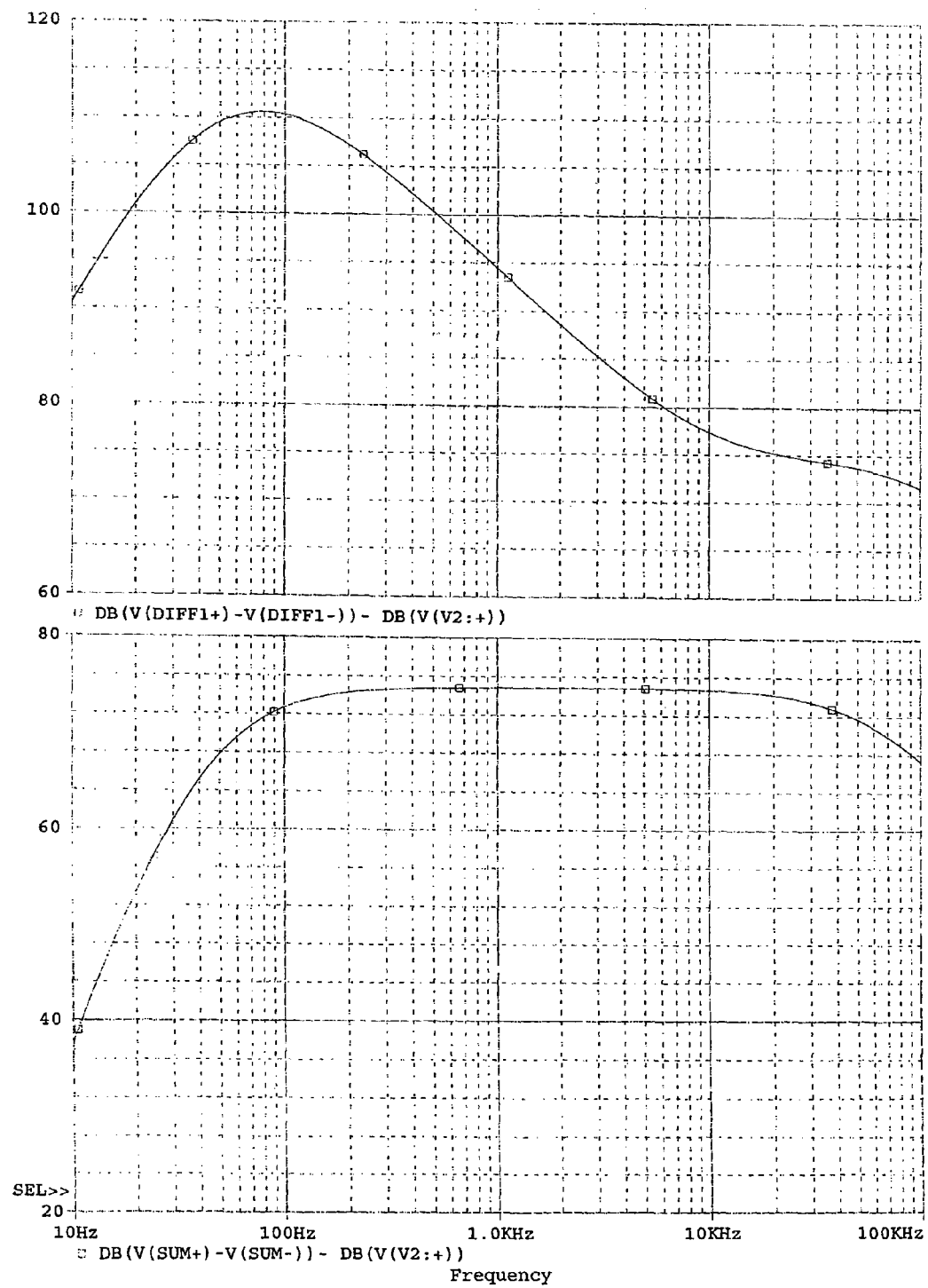
FIG. 6 are graphs illustrating the sum and difference amplifier response.

FIG. 6 are graphs illustrating the sum and difference amplifier response. The response curves are a standard Simulation Program with Integrated Circuits Emphasis (SPICE) model output that assumes either a swept constant amplitude sine wave or white noise. The x-axis on each graph is frequency and the y-axis is voltage in decibels. The upper graph is the difference signal DIFF1 response and the lower graph is the summation signal SUM response from the sum and difference amplifier of FIG. 5.

The SUM output is equivalent to the prior art. Compatibility with conventional telemetry and processing is also provided for by the present invention. One main feature of the present invention that differs from a conventional DIFAR sonobuoy is in what is being sensed. A conventional DIFAR sonobuoy senses pressure at a single point and cross-axis motion via accelerometers, whereas the present invention senses virtual pressure at a single point via the SUM channel and cross-axis pressure gradient via the two DIFF channels. Further, the high frequency low-pass filter response corner can be modified by changing the simple capacitor-resistor shunt impedance of capacitor C5 and resistor R9, and capacitor C13 and resistor R26.

The electronics package 104 preferably also includes a compass for determining the alignment of the hydrophone assembly 110 by providing a directional magnetic reference signal. In a preferred embodiment of the present invention the compass is a flux gate compass that provides a magnetic North referencing system.

The system 100 is deployed, for example, by launch from an airplane. When the sonobuoy enters the water the contents of the sonobuoy are ejected from the canister. The float remains on the water surface and the deployable array 110 drops to a predetermined depth, being drawn downward by weight 106, which maintains the hydrophone assembly in a vertical orientation.

Acoustic waves which strike the array are converted by the hydrophone wires 120 into electrical signals which are then processed by the electronics package 104 and carried by a wire connection through the tether 104 to the float and electronics package 102, finally converted to a radio signal and conveyed by wireless transmission to a remote receiver.

While the above description contains many specifics, these specifics should not be construed as limitations of the invention, but merely as exemplifications of preferred embodiments thereof. For example, while the invention herein is particularly advantageous for military applications and has been described in terms of detection of submarines, it can clearly be employed in any situation wherein acoustic detection is needed, such as oceanographic or other scientific studies, rescue operations, and the like. Those skilled in the art will envision many other embodiments within the scope and spirit of the invention as defined by the claims appended hereto.

What is claimed is:

1. A hydrophone assembly, comprising:
    a) at least four hydrophone units for converting an acoustic signal to an electrical signal, said hydrophone units being in a parallel, spaced-apart spatial relationship with each other; and
    b) at least one spacer element to maintain the hydrophone units fixed in a cylindrically symmetric spatial relationship to each other,
    wherein said hydrophone units and spacer element are embedded in an encapsulant to form an elongated, flexible body, and
    wherein each hydrophone unit comprises a resilient central wire with a copper wire coiled around the resilient central wire, said copper wire being coated with a layer of polyvinylidene difluoride.

2. The hydrophone assembly of claim 1 wherein each hydrophone unit comprises a layer of flexible piezoelectric material disposed between two layers of conductive material.

3. The hydrophone assembly of claim 2 wherein the layers of piezoelectric material and conductive material are arranged concentrically.

4. The hydrophone assembly of claim 2 wherein the piezoelectric material is polyvinylidene difluoride.

5. The hydrophone assembly of claim of claim 1 wherein the central wire is fabricated from spring steel.

6. The hydrophone assembly of claim 1 wherein the layer of polyvinylidene difluoride coated onto the copper wire has a layer of silver ink deposited thereon.

7. The hydrophone assembly of claim 1 wherein each hydrophone unit has a length of from about $12\lambda$ to about $18\lambda$, wherein $\lambda$ is the wavelength of a target acoustic signal.

8. The hydrophone assembly of claim 1 wherein the hydrophone units are spaced diametrically apart from each other by a distance of from about $\lambda/4$ to about $\lambda/20$, wherein $\lambda$ is the wavelength of a target acoustic signal.

9. The hydrophone assembly of claim 1 further comprising an axially extending non-metallic central support wire and/or fiber reinforced flexible tubing exoskeleton.

10. The hydrophone assembly of claim 1 wherein the encapsulant has a density-sound speed product when cured approximately equal to that of seawater.

11. The hydrophone assembly of claim 10 wherein the encapsulant is a polyurethane rho c encapsulant.

12. The hydrophone assembly of claim 1 wherein the hydrophone assembly determines a virtual pressure at a single point based on a summation of electrical signals received from the hydrophone units and determines a cross-axis pressure gradient based on differences between electrical signals of opposing hydrophone units.

13. The hydrophone assembly of claim 1 further comprising a signal processing module for amplifying electrical signals from the hydrophone units, calculating differences between electrical signals of opposing hydrophone units, and calculating sums of the electrical signals of the hydrophone units.

14. The hydrophone assembly of claim 13 wherein the signal processing module applies 1/f functions to the differences and sums, where f is frequency, and provides greater amplification to lower frequency signals than higher frequency signals as part of a weighting function.

* * * * *